(12) United States Patent
Chakravarti et al.

(10) Patent No.: US 10,112,254 B2
(45) Date of Patent: Oct. 30, 2018

(54) METHOD FOR MAKING CLAD METAL PIPE

(71) Applicant: Huntington Alloys Corporation, Huntington, WV (US)

(72) Inventors: Bhaven Chakravarti, Bellaire, TX (US); Brian A. Baker, Kitts Hill, OH (US); Debajyoti Maitra, Huntington, WV (US)

(73) Assignee: Huntington Alloys Corporation, Huntington, WV (US)

( * ) Notice: Subject to any disclaimer, the term of this patent is extended or adjusted under 35 U.S.C. 154(b) by 498 days.

(21) Appl. No.: 14/829,039

(22) Filed: Aug. 18, 2015

(65) Prior Publication Data

US 2016/0052080 A1     Feb. 25, 2016

Related U.S. Application Data

(60) Provisional application No. 62/040,056, filed on Aug. 21, 2014.

(51) Int. Cl.
| | |
|---|---|
| *B23K 20/00* | (2006.01) |
| *B23K 20/227* | (2006.01) |
| *C22F 1/10* | (2006.01) |
| *C21D 6/00* | (2006.01) |
| *C21D 9/08* | (2006.01) |
| *C21D 1/60* | (2006.01) |
| *C22C 38/52* | (2006.01) |
| *C22C 38/50* | (2006.01) |
| *C22C 38/48* | (2006.01) |
| *C22C 38/46* | (2006.01) |
| *C22C 38/44* | (2006.01) |
| *C22C 38/42* | (2006.01) |
| *C22C 38/06* | (2006.01) |
| *C22C 38/04* | (2006.01) |
| *C22C 38/02* | (2006.01) |
| *C22C 38/00* | (2006.01) |
| *C22C 19/05* | (2006.01) |
| *B32B 15/01* | (2006.01) |
| *B23K 103/04* | (2006.01) |
| *B23K 103/18* | (2006.01) |
| *B23K 101/06* | (2006.01) |
| *B23K 101/10* | (2006.01) |

(52) U.S. Cl.
CPC .......... *B23K 20/001* (2013.01); *B23K 20/227* (2013.01); *B32B 15/015* (2013.01); *C21D 1/60* (2013.01); *C21D 6/004* (2013.01); *C21D 6/005* (2013.01); *C21D 6/007* (2013.01); *C21D 6/008* (2013.01); *C21D 9/08* (2013.01); *C21D 9/085* (2013.01); *C22C 19/055* (2013.01); *C22C 19/056* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22F 1/10* (2013.01); *B23K 2101/06* (2018.08); *B23K 2101/10* (2018.08); *B23K 2103/04* (2018.08); *B23K 2103/18* (2018.08); *B23K 2103/26* (2018.08)

(58) Field of Classification Search
CPC .................................................... B23K 20/001
See application file for complete search history.

(56) References Cited

U.S. PATENT DOCUMENTS

| | | | |
|---|---|---|---|
| 3,510,294 A | 5/1970 | Bieber et al. | |
| 4,639,576 A | 1/1987 | Shoemaker et al. | |
| 4,765,956 A | 8/1988 | Smith et al. | |
| 5,056,209 A | 10/1991 | Ohashi et al. | |
| 5,529,642 A | 6/1996 | Sugahara et al. | |
| 5,855,699 A | 1/1999 | Oyama et al. | |
| 5,908,486 A | 6/1999 | Flinn et al. | |
| 5,939,204 A | 8/1999 | Czech | |
| 6,242,112 B1 | 6/2001 | Forsberg et al. | |
| 6,296,953 B1 | 10/2001 | Lindén et al. | |
| 6,350,327 B2 | 2/2002 | Neill | |

(Continued)

FOREIGN PATENT DOCUMENTS

| | | |
|---|---|---|
| AU | 622856 | 2/1988 |
| CN | 101984124 | 3/2011 |

(Continued)

OTHER PUBLICATIONS

Lopez, B. et al., Interface Analysis on Diffusion Bonded Bimetallic Composites. Part 1: Extended Solid Solubility, Key Engineering Materials, Nov. 1, 1996, pp. 695-702, vol. 127-131, available at doi:10.4028/www.scientific.net/KEM.127-131.695, Trans Tech Publications, Switzerland.

*Primary Examiner* — Jessee R Roe
*Assistant Examiner* — Jophy S. Koshy
(74) *Attorney, Agent, or Firm* — Burris Law, PLLC

(57) ABSTRACT

A method of producing a nickel alloy clad steel pipe including: providing a hollow cylinder of nickel alloy cladding material and a hollow cylinder of steel, placing the hollow cylinder of the nickel alloy cladding material concentrically inside the hollow cylinder of steel or the hollow cylinder of the steel concentrically inside the hollow cylinder of nickel alloy cladding material to form a composite billet, heating the composite billet to 1121-1260° C., and extruding the composite billet, wherein the nickel alloy cladding material comprises 6.0-12.0 wt. % molybdenum, 19.0-27.0 wt. % chromium, 1.0 wt. % maximum tungsten, 0.6 wt. % maximum aluminum, 0.6 wt. % maximum titanium, 0.001-0.05 wt. % carbon, 0.001-0.035 wt. % nitrogen, 0.001-0.3 wt. % silicon, 1.0 wt. % maximum niobium, 2.5 wt. % maximum iron, 0.5 wt. % maximum manganese, 0.015 wt. % maximum phosphorous, 0.015 wt. % maximum sulfur, 1.0 wt. % maximum cobalt, and the balance nickel and may have a solidus temperature greater than 1312° C.

16 Claims, 4 Drawing Sheets

(56) References Cited

U.S. PATENT DOCUMENTS

| | | |
|---|---|---|
| 8,245,552 B2 | 8/2012 | Murakami et al. |
| 2004/0001966 A1 | 1/2004 | Subramanian et al. |
| 2005/0022529 A1 | 2/2005 | Takahashi et al. |
| 2005/0236079 A1 | 10/2005 | Ueta et al. |
| 2007/0181225 A1 | 8/2007 | Igarashi et al. |
| 2010/0285327 A1 | 11/2010 | Sutherlin et al. |
| 2011/0058977 A1 | 3/2011 | Sato et al. |
| 2012/0288400 A1 | 11/2012 | Hirata et al. |

FOREIGN PATENT DOCUMENTS

| | | |
|---|---|---|
| EP | 0366646 A1 | 5/1990 |
| JP | 60187652 A | 9/1985 |
| JP | 6199649 A | 5/1986 |
| JP | 63290236 A | 11/1988 |
| JP | 4235243 A | 8/1992 |
| JP | 5214499 A | 8/1993 |
| JP | 6248493 A | 9/1994 |
| JP | 7316700 A | 12/1995 |
| JP | 8103867 A | 4/1996 |
| JP | 987786 A | 3/1997 |
| JP | 10193174 A | 7/1998 |
| JP | 10237573 | 9/1998 |
| JP | 10272593 A | 10/1998 |
| JP | 2001107196 A | 4/2001 |
| JP | 2002302726 A | 10/2002 |
| JP | 2004035909 | 2/2004 |
| JP | 200597743 A | 4/2005 |
| JP | 2005118875 A | 5/2005 |
| JP | 2005288500 A | 10/2005 |
| JP | 2006274386 A | 10/2006 |
| JP | 2011147947 A | 8/2011 |
| JP | 2013100584 A | 5/2013 |
| WO | 2011036045 A1 | 3/2011 |

METHOD FOR MAKING CLAD METAL PIPE

CROSS REFERENCE TO RELATED APPLICATION

This application claims priority to U.S. Provisional Application No. 62/040,056 filed on Aug. 21, 2014, the disclosure of which is hereby incorporated in its entirety by reference.

BACKGROUND OF THE INVENTION

Field of the Invention

The present invention relates to a method of making clad metal pipe by hot extrusion and, specifically, to a method of making clad metal pipe having a cladding layer of nickel alloy and a base of carbon steel, low alloy steel, or chrome-molybdenum steel.

Description of Related Art

Clad materials have been used widely in various applications. A clad material is a combination of two different types of metals or alloys that are adhered to one another such that the desirable characteristics of each of the metals can be utilized.

The clad material produced in the largest amount is clad steel plate in which one of the metals (called the "parent metal") is carbon steel, low alloy steel, or the like, and the other cladding metal is stainless steel, titanium, or another corrosion resistant material. In this way, the corrosion resistance of the more expensive corrosion resistant material can be utilized on one or both sides of the less expensive parent metal to provide a lower cost product having the high corrosion resistance of the corrosion resistant material and the mechanical properties of the low cost parent metal.

Cladding has also been practiced in manufacturing many types of pipe. In the production of pipe, a pipe made of one metal is inserted into a pipe made from another metal to make a billet. The billet is heated to a high temperature, and then subjected to hot extrusion. Manufacturing costs and properties of the product pipe are important considerations in determining the materials to be used for the pipes. For example, for use in line piping used in the oil and gas industry, in which not only high strength but also improved resistance to corrosion are required, it is advantageous to use clad pipe comprising carbon steel or low alloy steel, which is less expensive and of high strength as the parent metal on the outside of the pipe, and a nickel-base alloy with improved resistance to corrosion as the cladding layer on the inside of the pipe.

A common nickel cladding material used in this process is described in U.S. Pat. No. 4,765,956. This nickel cladding material has a composition comprising: 6 to 12% molybdenum, 19 to 27% chromium, 2 to 5% niobium, up to 8% tungsten, up to 0.6% aluminum, up to 0.6% titanium, up to 0.03% carbon, up to 0.03% nitrogen, up to 0.35% silicon, the carbon, nitrogen, and silicon being correlated such that the sum of % carbon+% nitrogen+1/10% silicon is less than about 0.035%, up to 5% iron, and the balance nickel.

However, at any given temperature, the nickel based alloy has a higher resistance to deformation, i.e., higher high temperature strength, than the carbon steel or low alloy steel parent metal. This differential in resistance to deformation leads to delamination of the inner corrosion resistant alloy layer and/or surface defects in the cladding material including cracking and non-uniform thickness.

U.S. Pat. No. 5,056,209 to Ohashi et al. teaches that the resistance to deformation of both the parent metal and the nickel cladding tends to decrease as temperature increases and, thus, heating the billet to a high temperature before extrusion should help to reduce the defects in the nickel cladding. However, Ohashi points out that the heating temperature of the billet must be kept lower than the solidus temperature of the nickel cladding alloy so that intermetallic compounds concentrated along the grain boundaries do not turn into a liquid phase causing degradation in the ease of pipe formation and the properties of the product. Thus, Ohashi concludes that increasing the heating temperature of the billet is not a good way to solve the above-described problems. In addition, Ohashi states that it is impossible to completely remove the cracking only by heating the starting materials to a high temperature.

To solve the problem, Ohashi teaches heating the cladding material having the higher resistance to deformation to a higher temperature than the parent material prior to extrusion thus reducing the deformation resistance of the cladding material, bringing it closer to the deformation resistance of the parent material, and reducing the susceptibility of the cladding material to cracking.

However, the method of Ohashi requires additional processing steps and equipment making it costly and more difficult to perform. Also, the method of Ohashi has a fairly narrow temperature window for successful extrusion. Implementing such a narrow window makes practical extrusion procedures difficult to execute.

SUMMARY OF THE INVENTION

The present invention is directed to a method of producing a nickel alloy clad steel pipe. A hollow cylinder of nickel alloy cladding material and a hollow cylinder of steel are provided. The hollow cylinder of the nickel alloy cladding material is placed concentrically inside the hollow cylinder of steel or the hollow cylinder of the steel is placed concentrically inside the hollow cylinder of nickel alloy cladding material to form a composite billet. The composite billet is heated to an extrusion temperature of 1121-1260° C. (2050-2300° F.) and extruded. The nickel alloy cladding material comprises: 6.0 to 12.0 wt. % molybdenum, 0.19.0 to 27.0 wt. % chromium, 1.0 wt. % maximum tungsten, 0.6 wt. % maximum aluminum, 0.6 wt. % maximum titanium, 0.001 to 0.05 wt. % carbon, 0.001 to 0.035 wt. % nitrogen, 0.001 to 0.3 wt. % silicon, 1.0 wt. % maximum niobium, 2.5 wt. % maximum iron, 0.5 wt. % maximum manganese, 0.015 wt. % maximum phosphorous, 0.015 wt. % maximum sulfur, 1.0 wt. % maximum cobalt, and the balance nickel and incidental impurities; preferably, comprises 8.5 to 10.0 wt. % molybdenum, 20.0 to 23.0 wt. % chromium, 1.0 wt. % maximum tungsten, 0.4 wt. % maximum aluminum, 0.4 wt. % maximum titanium, 0.025 wt. % maximum carbon, 0.02 wt. % maximum nitrogen, 0.15 wt. % maximum silicon, 0.75 wt. % maximum niobium, 1.0 wt. % maximum iron, 0.5 wt. % maximum manganese, 0.015 wt. % maximum phosphorous, 0.015 wt. % maximum sulfur, 1.0 wt. % maximum cobalt, and the balance nickel and incidental impurities; and more preferably, comprises 8.5 to 10.0 wt. % molybdenum, 20.0 to 23.0 wt. % chromium, 1.0 wt. % maximum tungsten, 0.4 wt. % maximum aluminum, 0.4 wt. % maximum titanium, 0.01 wt. % maximum carbon, 0.02 wt. % maximum nitrogen, 0.15 wt. % maximum silicon, 0.5 wt. % maximum niobium, 0.5 wt. % maximum iron, 0.5 wt. % maximum manganese, 0.015 wt. % maximum phosphorous, 0.015 wt. % maximum sulfur, 1.0 wt. % maximum cobalt, and the balance nickel and incidental impurities, and may have a solidus temperature of greater than 1312° C. (2393° F.). The nickel cladding alloy may comprise greater than 0 wt. % niobium. The method may also include heat treating of the extrudate and air or water quenching, which may be followed by one or more heat treatments selected from the group consisting of solution annealing, austenizing, and tempering. The method may further comprise a water quench after each heat treatment.

DESCRIPTION OF THE INVENTION

The present invention is directed to a method of co-extruding pipe having a corrosion resistant nickel alloy cladding on the inner diameter or the outer diameter and a carbon steel, low alloy steel, or chrome-molybdenum steel parent metal.

The nickel alloy cladding comprises: 6.0 to 12.0 wt. % molybdenum, 19.0 to 27.0 wt. % chromium, 1.0 wt. % maximum tungsten, 0.6 wt. % maximum aluminum, 0.6 wt. % maximum titanium, 0.001 to 0.05 wt. % carbon, 0.001 to 0.035 wt. % nitrogen, 0.001 to 0.3 wt. % silicon, 1.0 wt. % maximum niobium, 2.5 wt. % maximum iron, 0.5 wt. % maximum manganese, 0.015 wt. % maximum phosphorous, 0.015 wt. % maximum sulfur, 1.0 wt. % maximum cobalt, and the balance nickel and incidental impurities. Preferably, the nickel alloy cladding comprises: 8.5 to 10.0 wt. % molybdenum, 20.0 to 23.0 wt. % chromium, 1.0 wt. % maximum tungsten, 0.4 wt. % maximum aluminum, 0.4 wt. % maximum titanium, 0.025 wt. % maximum carbon, 0.02 wt. % maximum nitrogen, 0.15 wt. % maximum silicon, 0.75 wt. % maximum niobium, 1.0 wt. % maximum iron, 0.5 wt. % maximum manganese, 0.015 wt. % maximum phosphorous, 0.015 wt. % maximum sulfur, 1.0 wt. % maximum cobalt, and the balance nickel and incidental impurities. More preferably, the nickel alloy cladding comprises: 8.5 to 10.0 wt. % molybdenum, 20.0 to 23.0 wt. % chromium, 1.0 wt. % maximum tungsten, 0.4 wt. % maximum aluminum, 0.4 wt. % maximum titanium, 0.01 wt. % maximum carbon, 0.02 wt. % maximum nitrogen, 0.15 wt. % maximum silicon, 0.5 wt. % maximum niobium, 0.5 wt. % maximum iron, 0.5 wt. % maximum manganese, 0.015 wt. % maximum phosphorous, 0.015 wt. % maximum sulfur, 1.0 wt. % maximum cobalt, and the balance nickel and incidental impurities.

Niobium (Nb): 1.0 wt. % Maximum

Figure 1:
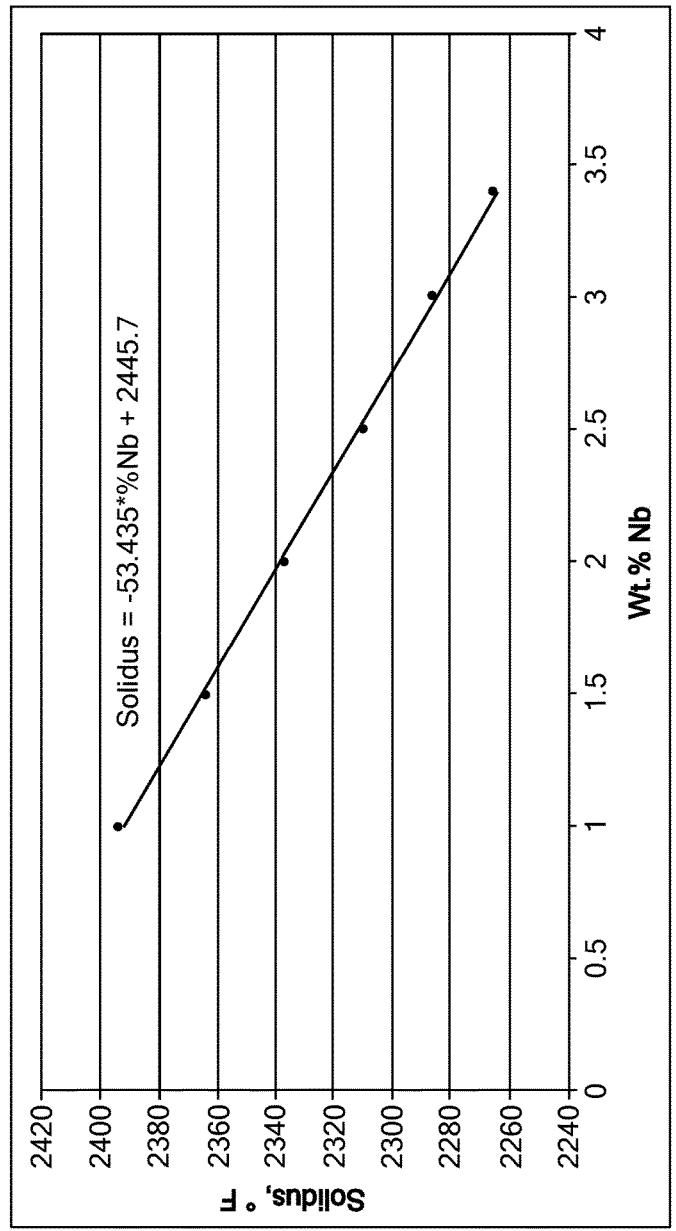
FIG. 1 is a graph showing the effect of niobium content on the solidus temperature of a nickel alloy cladding material as predicted by the JMATPRO® brand software.

In the nickel alloy cladding of the present invention, the Nb maximum is 1.0 wt. % in order to assure that the solidus of the extrusion billet is greater than 1312° C. (2393° F.). This permits the cladding alloy of the extrusion billet to have a very low flow stress approaching that of the steel casing without forming a liquid phase leading to liner failure. This increase in solidus temperature as a function of Nb content as predicted by the THERMO-CALC™ brand software can be seen in FIGS. 1-4. Using the equation given in FIG. 1, the predicted solidus is 1312° C. (2393° F.) at 1.0 wt. % Nb, 1318° C. (2406° F.) at 0.7 wt. % Nb, and 1326° C. (2418° F.) at 0.5 wt. % Nb. At the higher solidus temperature, the allowable maximum extrusion temperature can be increased. Preferably, the solidus temperature is increased to greater than 1312° C. (2393° F.).

Figure 2:
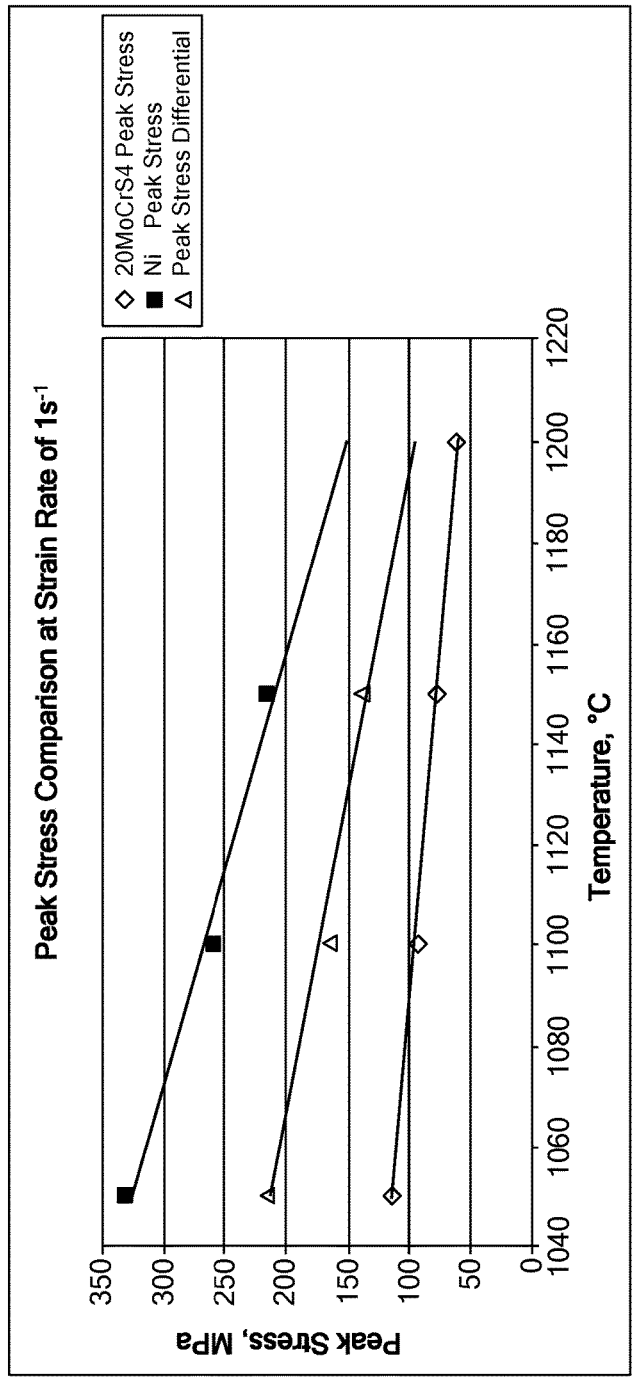
FIG. 2 is a graph comparing peak flow stress at a strain rate of 1 s$^{-1}$ for a common steel (MoCrS4) parent metal and a nickel alloy cladding material.
Figure 3:
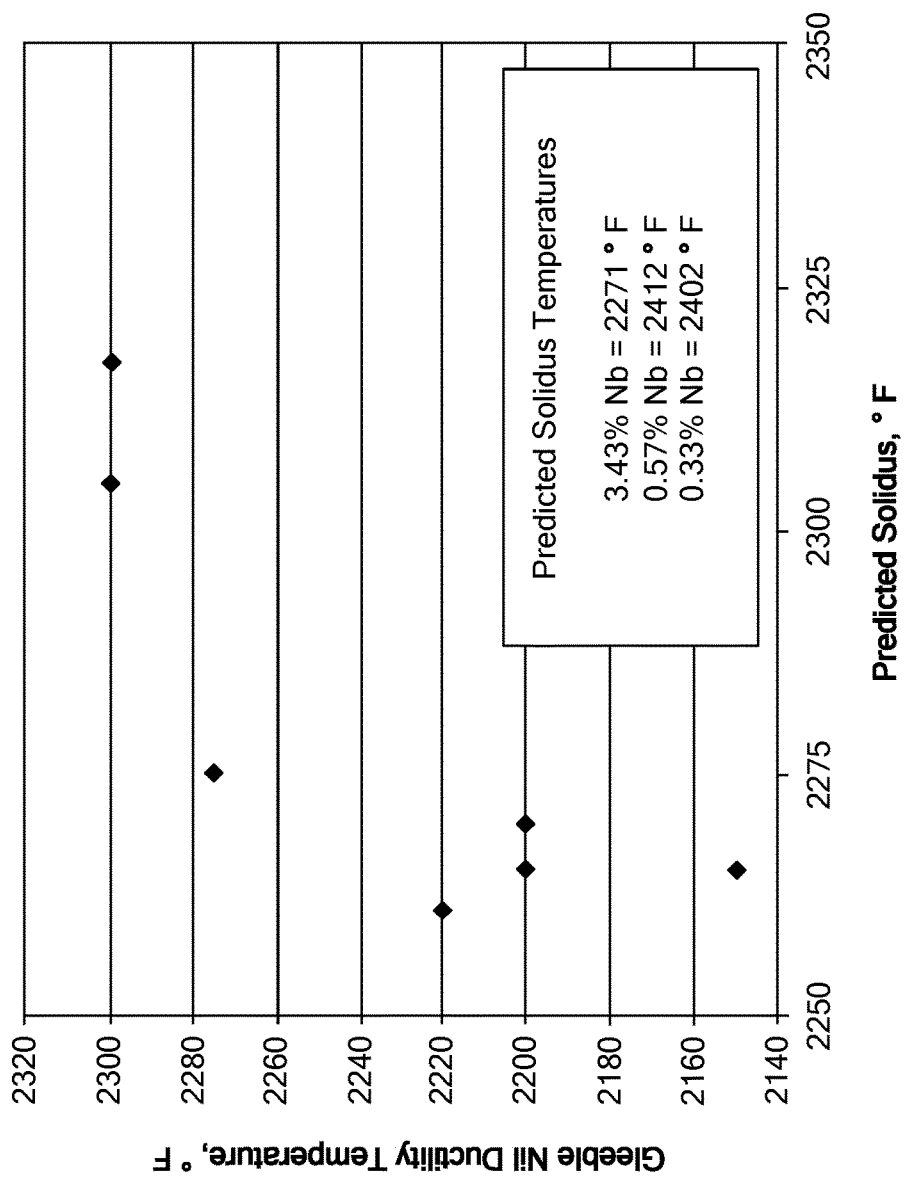
FIG. 3 is a graph showing the effect of solidus temperature on ductility for a nickel alloy cladding material.
Figure 4:
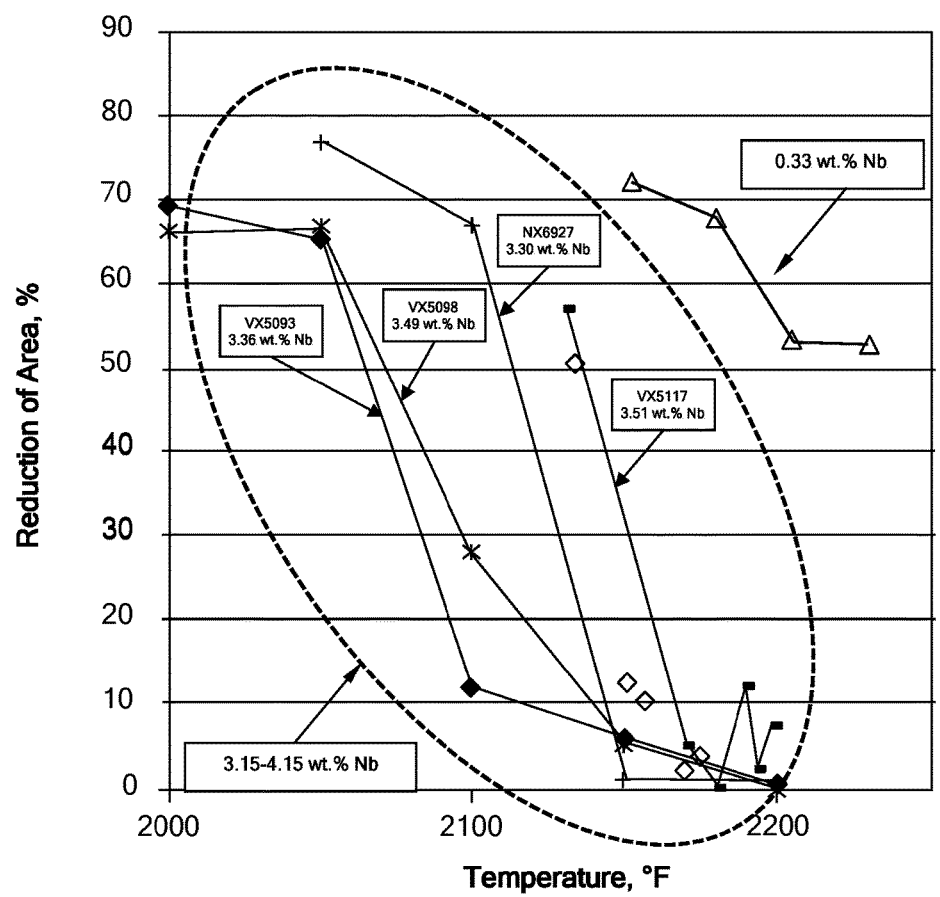
FIG. 4 is a graph showing the effect of niobium content and temperature on the reduction of area of nickel alloy cladding materials.

At, the increased extrusion temperature, the nickel alloy cladding has reduced flow stress as shown in FIG. 2 which shows the peak flow stress of the inventive nickel alloy cladding as compared to the peak flow stress of a 20MoCrS4 parent material. It can be seen that, at higher extrusion temperatures, the difference between the peak flow stress of the nickel cladding material and the parent material is decreased. Also, at the increased extrusion temperature, the nickel alloy cladding has improved ductility as shown in FIG. 3 which shows increased ductility at higher solidus temperatures. This improvement in ductility can also be seen in FIG. 4 where the reduction of area for the nickel cladding material with 0.33 wt. % Nb is significantly higher at higher temperatures than the reduction of area for the nickel cladding material having 3.15-4.15 wt. % Nb. As can be seen, the reduction of area for the nickel cladding material having 3.15-4.15 wt. % Nb drops to zero at approximately 1204° C. (2200° F.), while the nickel cladding material having 0.33 wt. % Nb has a reduction of area of approximately 55 wt % at the same temperature.

All these factors in totality significantly enhance the extrusion behavior allowing commercial scale production of the coextruded clad pipes without surface defects in the cladding and without the need for the additional equipment and complexity required when using differential extruding temperatures for the parent metal and the cladding.

Even though carbon is kept as low as possible, at least a minimum amount of niobium is needed to tie up the carbon that is present, in order to stabilize the alloy from sensitization and providing good intergranular corrosion resistance.

Niobium is used in alloys like the alloy described in U.S. Pat. No. 4,765,956 to impart the high temperature properties, including high temperature stress rupture resistance, required for high temperature gas turbine applications. However, alloys like this also have excellent general corrosion properties and particularly good pitting and crevice resistance in high chloride, sour environments and, therefore, have been found to be useful in oil and gas applications where the high temperature properties imparted by the niobium are not needed. The alloy's corrosion resistance is derived mainly from the molybdenum and chromium present in the alloy as expressed in the general Pitting Resistance Equivalent Number, (PREN) formula: PREN=% Cr+3.3% Mo. While niobium also provides a small contribution to the corrosion resistance of the alloy, its contribution is minimal enough that it is not included in the PREN formula used to determine the relative corrosion resistance of alloys. Thus, the alloy used in the inventive method containing less niobium (75° C. (167° F.) in ASTM G48-C, 10 mils per year in ASTM G28-A) is only slightly less corrosion resistant than the alloy described in U.S. Pat. No. 4,765,956 (80° C. (176° F.) in ASTM G48-C, 16 mils per year in ASTM G28-A) as shown in Table 1 where the Critical Pitting Temperature (CPT) was determined to be 75° C. (167° F.). This small reduction in corrosion resistance due to the low niobium can be offset by boosting the amounts of other alloying elements like chrome and molybdenum.

TABLE 1

Critical Pitting Temperature (CPT) as per ASTM G48-C for Nickel Cladding for Inventive Co-extruded Tube Environment: ASTM G48-C for 72 Hours Exposed at Stated Temperatures

| Heat/ Sample ID | Temperature (° C.) | Pit Max Depth (mils) | Comments |
|---|---|---|---|
| 60-1 | 60 | No Pitting | |
| 60-2 | 60 | No Pitting | |
| 70-1 | 70 | No Pitting | |
| 70-2 | 70 | No Pitting | |
| 75-1 | 75 | <1 | Light Pitting Occurred on Both ID and OD of Specimen |
| 75-2 | 75 | 15 | Pitting Occurred on ID of Specimen |
| 80-1 | 80 | 15 | Max Pit Occurred on ID, With Light Pitting of <1 mil on OD |
| 80-2 | 80 | Full Penetration | Pitting Occurred on Both ID and OD of Specimen |
| 85-1 | 85 | Full Penetration | Pitting Occurred on Both ID and OD of Specimen |
| 85-2 | 85 | Full Penetration | Pitting Occurred on Both ID and OD of Specimen |

Note:
Sample Material ID Had a Very Heavy Oxide Which Required Heavy Grinding. Additional Grinding was Needed Even After This Oxide was Removed to Achieve Cohesive Testing Results.
Chemistry of the nickel cladding: wt. % C = 0.008, wt. % Mn = 0.08, wt. % Si = <0.005, wt. % P = <0.005, wt. % S = 0.001, wt. % Cr = 22.24, wt. % Mo = 9.04, wt. % Nb = 0.14, wt. % Fe = 2.18, wt. % Al = 0.34, wt. % Ti = 0.20, nickel balance Molybdenum (Mo): 6.0 to 12.0 wt. %

Molybdenum is beneficial in increasing the strength of the alloy through solid solution strengthening and provides resistance to localized pitting and crevice corrosion. To achieve the desired effect, the molybdenum is controlled to be at least 6.0 wt. % and, preferably, at least 8.5 wt. %.

However, excessive amounts of molybdenum can lead to the formation of unwanted phases in the alloy, such as sigma phase. Accordingly, the molybdenum content controlled to be at most 12.0 wt. % and, preferably, at most 10.0 wt. %.

Chromium (Cr): 19.0 to 27.0 wt. %

A minimum of 19.0 wt. % chromium is necessary in order to impart corrosion resistance to the alloy. To achieve the desired effect, the chromium is controlled to be at least 19.0 wt. % and, preferably, at least 20.0 wt. %.

A maximum of 27.0 wt. % chromium is required in order to avoid precipitation of undesirable phases, such as, sigma and alpha Cr. Accordingly, the chromium content is controlled to be at most 27.0 wt. % and, preferably, at most 23.0 wt. %.

Tungsten (W): 1.0 wt. % Maximum

Tungsten, in addition to the required molybdenum content of 6.0 to 12.0 wt. %, can be added to the alloy to the extent of 1.0 wt. % without adversely affecting the mechanical and corrosion resistant properties of the roll cladding. However, above about 1.0 wt. % W, the alloy becomes susceptible to undesirable phases and higher flow stress during extrusion. Accordingly, the tungsten content is controlled to be at most 1.0 wt. %.

Aluminum (Al): 0.6 wt. % Maximum

Aluminum should not exceed about 0.6 wt. % in order to avoid the precipitation of gamma prime which can harden the alloy, and thereby, increase the susceptibility of the roll cladding debonding during fabrication. Al is added to the alloy during melting in order to enhance deoxidation of the alloy. Accordingly, the aluminum content is controlled to be at most 0.6 wt. % and, preferably, at most 0.4 wt. %.

Titanium (Ti): 0.6 wt. % Maximum

Titanium should not exceed about 0.6 wt. % in order to avoid the precipitation of gamma prime which can harden the alloy and, thereby, increase the susceptibility of the roll cladding debonding during fabrication. Ti is added to the alloy during melting to enhance malleability during the roll cladding during manufacture. Accordingly, the titanium content is controlled to be at most 0.6 wt. % and, preferably, at most 0.4 wt. %.

Carbon (C): 0.001 to 0.05 wt. %

Carbon is added at a minimum of 0.001 wt. % to aid in deoxidation of the alloy during melting. To achieve the desired effect, the carbon is controlled to be at least 0.001 wt. %.

Carbon must be maintained below a maximum of 0.05 wt. % in order to avoid precipitation of interfacial carbides, which are brittle, and greatly impede fabricability. Accordingly, the carbon content is controlled to be at most 0.05 wt. %, preferably at most 0.025 wt. %, and more preferably, 0.01 wt. %.

Nitrogen (N): 0.001 to 0.035 wt. %

Nitrogen within its solubility limit in the alloy will favorably enhance strength and corrosion resistance without adversely affecting ductility. To achieve the desired effect, the nitrogen is controlled to be at least 0.001 wt. %.

Nitrogen above its solubility limit at any given temperature will combine with titanium during melting to form TiN which will dramatically adversely impact the roll bonding procedure. Accordingly, the nitrogen content is controlled to be at most 0.035 wt. % and, preferably, at most 0.02 wt. %.

Silicon (Si) 0.001 to 0.3 wt. %

A minimum of 0.001 wt. % Si is added to the alloy to enhance the roll bonding process by enhancing the wettability of the alloy to the steel during the roll bonding procedure. To achieve the desired effect, the silicon is controlled to be at least 0.001 wt. %.

Silicon is highly detrimental to high temperature ductility during the roll bonding procedure and is to be avoided above its defined maximum content. Accordingly, the silicon content is controlled to be at most 0.3 wt. % and, preferably, at most 0.15 wt. %.

Iron (Fe): 2.5 wt. % Maximum

Iron must be limited to a maximum of 2.5 wt. % in order to maintain corrosion resistance and ensure that the roll cladding exhibits at least a 60° C. (140° F.) Critical Pitting Temperature as per ASTM G48-C. Accordingly, the iron content is controlled to be at most 2.5 wt. %, preferably, at most 1.0 wt. %, and more preferably, at most 0.5 wt. %.

Manganese (Mn): 0.5 wt. % Maximum

Manganese must be maintained below a maximum of 0.5 wt. % in order to assure workability in all operating procedures. Accordingly, the manganese content is controlled to be at most 0.5 wt. %.

Phosphorous (P): 0.015 wt. % Maximum

Phosphorous must be maintained below 0.015 wt. % in order to assure optimum mechanical properties and malleability of the roll cladding during manufacture. Accordingly, the phosphorous content is controlled to be at most 0.015 wt. %.

Sulfur (S): 0.015 wt. % Maximum

Sulfur must be maintained below 0.015 wt. % in order to assure optimum mechanical properties and malleability of the roll cladding during manufacture. Accordingly, the sulfur content is controlled to be at most 0.015 wt. %.

Cobalt (Co): 1.0 wt. % Maximum

Cobalt above about 1.0 wt. % can adversely increase strength during processing while adding to cost without conferring any beneficial effect. Accordingly, the cobalt content is controlled to be at most 1.0 wt. %.

The parent metal is a carbon steel, low alloy steel, or chrome-molybdenum steel. Such steels include, but are not limited to, steels meeting the American Petroleum Institute Specification for Line Pipe (API Specification 5L) for Grades X52 to Grades X80 and other carbon and low alloy steels.

A hollow, cylindrical billet having carbon steel, low alloy steel, or chrome-molybdenum steel parent metal on the outer diameter and nickel alloy cladding on the inner diameter is provided. The proportions of the parent metal and the cladding are chosen based on the wall thickness distribution required in the final pipe. The billet may be produced by placing a hollow cylinder of the nickel alloy cladding material concentrically inside a hollow cylinder of the parent material. The hollow cylindrical billets may be prepared by any suitable method.

Alternatively, a hollow, cylindrical billet having carbon steel, low alloy steel, or chrome-molybdenum steel parent metal on the inner diameter and nickel alloy cladding on the outer diameter is provided. The billet may be produced by placing a hollow cylinder of the nickel alloy cladding material concentrically around the outside of a hollow cylinder of the parent material.

The billet is heated in a furnace to the extrusion temperature. The extrusion temperature may be 1121-1260° C. (2050-2300° F.). Once the billet is at the extrusion temperature, it is extracted from the furnace and loaded onto the extrusion press for extrusion. The extrusion press is set up with properly sized tooling to produce the desired size pipe diameters, parent metal and cladding wall thickness distribution, and length.

Heat treatment after extruding is selected based on the requirements for the properties of the parent material and the cladding, and may include one or more heat treatments selected from solution annealing, austenitizing, and tempering. Each heat treatment step may be followed by an air or preferably a water quench. For example, for API 5L X Grade materials with nickel alloy cladding, the heat treatment should include quenching and tempering the parent material and solutionizing the nickel alloy.

EXAMPLES

An initial billet for extrusion was prepared using a Grade X65 steel pipe (composition is given in Table 2 below), trepanned, and machined into a hollow cylinder having a 276.4 mm (10.88 inches) outer diameter by 68.6 mm (2.70 inches) wall by 1003.3 mm (39.5 inches) length with an inner liner of the corrosion resistant nickel alloy (composition is given in Table 2 below) having a 138.9 mm (5.47 inches) outer diameter by 28.2 mm (1.11 inches) wall by 1003.3 mm (39.5 inches) length. The nickel alloy was made using a VIM/ESR cast ingot. The extrusion billet was heated to 1232° C. (2250° F.) and extruded to a 10 meter (32.8 ft) pipe with an outer steel casing of 203.2 mm (8.0 inches) and an inner diameter of 169.1 mm (6.66 inches) at the interface and an inner corrosion resistant liner of 169.1 mm (6.66 inches) outer diameter at the interface and an inner liner diameter of 165.1 mm (6.5 inches). Thus, the steel casing was 17.1 mm (0.67 inches) in thickness and the corrosion resistant inner liner was 2.00 mm (0.08 inches) in thickness. The extrudate was air cooled to room temperature and then given a solution anneal at 982° C. (1800° F.) for one hour and water quenched. To austenize the steel, the pipe was then given a 926° C. (1699° F.) heat treatment for one and a half hours followed by a water quench. The pipe was then tempered at 635° C. (1175° F.) for two hours followed by a water quench.

TABLE 2

Composition of the Grade X65 Steel and the Corrosion Resistant Inner Liner Alloy

| Alloy | C | Mn | P | S | Ni | Cr | Mo | Cu |
|---|---|---|---|---|---|---|---|---|
| X65 | 0.10 | 1.18 | 0.006 | 0.003 | 0.26 | 0.17 | 0.16 | 0.16 |
| Liner | 0.04 | 0.01 | 0.006 | 0.001 | 66.0 | 22.4 | 8.82 | — |

| Alloy | Fe | Co | Al | Ti | Nb | V | Si |
|---|---|---|---|---|---|---|---|
| X65 | 97.6 | 0.01 | 0.03 | <0.01 | 0.03 | 0.05 | 0.27 |
| Liner | 2.14 | 0.05 | 0.12 | 0.20 | 0.10 | — | 0.03 |

The pipe was then evaluated for mechanical properties. Per ASTM E8, the pipe was found to have a 67.5 ksi 0.2% yield strength, an ultimate tensile strength of 82.2 ksi, an elongation of 32%, and a reduction in area of 83%. The Charpy Impact strength was 299 ft-lbs (average of three tests) at −29° C. (−20° F.). The midwall hardness of the steel was measured as 192 Vickers per ASTM E384 using a 10 kgf indenter load and the inner liner hardness was 199 Vickers.

To demonstrate the corrosion resistance of the inner liner, two tests were conducted. The ASTM G28-A Method test result was 0.16 mm/year, and the ASTM G48-C Method A test result at 50° C. (122° F.) after 72 hours was 0.6 mg.

A second billet for extrusion was prepared using a Grade X65 steel pipe (composition is given in Table 3 below), trepanned, and machined into a hollow cylinder having a 276.4 mm (10.88 inches) outer diameter by 68.6 mm (2.70 inches) wall by 1003.3 mm (39.5 inches) length with an inner liner of the corrosion resistant nickel alloy (composition is given in Table 3 below) having a 138.9 mm (5.47 inches) outer diameter by 28.2 mm (1.11 inches) wall by 1003.3 mm (39.5 inches) length. The nickel alloy was made using a VIM/ESR cast ingot. The extrusion billet was heated to 1232° C. (2250° F.) and extruded to a 10 meter (35.8 ft) pipe with an outer steel casing of 203.2 mm (8.0 inches) and an inner diameter of 169.1 mm (6.66 inches) at the interface and an inner corrosion resistant liner of 169.1 mm (6.66 inches) outer diameter at the interface and an inner liner diameter of 165.1 mm (6.5 inches). Thus, the steel casing was 17.1 mm (0.67 inches) in thickness and the corrosion resistant inner liner was 2.00 mm (0.08 inches) in thickness. The extrudate was air cooled to room temperature and then given a solution anneal at 982° C. (1800° F.) for one hour and water quenched. To austenize the steel, the pipe was then given a 926° C. (1699° F.) heat treatment for one and a half hours followed by a water quench. The pipe was then tempered at 635° C. (1175° F.) for two hours followed by a water quench.

TABLE 3

Composition of the Grade X65 Steel and the Corrosion Resistant Inner Liner Alloy

| Alloy | C | Mn | P | S | Ni | Cr | Mo | Cu |
|---|---|---|---|---|---|---|---|---|
| X65 | 0.09 | 1.15 | 0.008 | 0.003 | 0.24 | 0.18 | 0.15 | 0.14 |
| Liner | 0.02 | 0.01 | 0.007 | 0.001 | 67.1 | 22.7 | 8.91 | — |

| Alloy | Fe | Co | Al | Ti | Nb | V | Si |
|---|---|---|---|---|---|---|---|
| X65 | 97.7 | 0.01 | 0.03 | <0.01 | 0.03 | 0.04 | 0.27 |
| Liner | 0.62 | 0.03 | 0.26 | 0.28 | <0.01 | — | 0.03 |

The pipe was then evaluated for mechanical properties. Per ASTM E8, the pipe was found to have a 67.2 ksi 0.2% yield strength, an ultimate tensile strength of 85.2 ksi, an elongation of 32%, and a reduction in area of 80%. The Charpy Impact strength was 214 ft-lbs (average of three tests) at −29° C. (−20° F.). The midwall hardness of the steel was measured as 194 Vickers per ASTM E384 using a 10 kgf indenter load, and the inner liner hardness was 206 Vickers.

To demonstrate the corrosion resistance of the inner liner, two tests were conducted. The ASTM G28-A Method test result was 0.73 mm/year, and the ASTM G48-C Method A test result at 50° C. (122° F.) after 72 hours was 3.3 mg.

Four additional billets for extrusion to a smaller size pipe were prepared using a Grade X65 steel pipe (composition is given in Table 4 below) machined into a hollow cylinder having a 276.4 mm (10.88 inches) outer diameter by 68:6 mm (2.701 inches) wall by 1003.3 mm (39.5 inches) length with an inner liner of the corrosion resistant nickel alloy (composition is given in Table 4 below) having a 138.9 mm (5.47 inches) outer diameter by 28.2 mm (1.11 inches) wall by 1003.3 mm (39.5 inches) length. The nickel alloy was made using VIM/VAR cast ingot. The extrusion billet was heated to 1232° C. (2250° F.) and extruded to a pipe with an outer steel casing of 114.3 mm (4.5 inches) and an inner diameter of 84.3 mm (3.32 inches) at the interface and an inner corrosion resistant liner of 84.3 mm (3.32 inches) outer diameter at the interface and an inner liner diameter of 76.2 mm (3.0 inches). Thus the steel casing was 15 mm (0.59 inches) in thickness and the corrosion resistant inner liner was 4.06 mm (0.16 inches) in thickness. The extrudate was air cooled to room temperature and then given a solution anneal at 982° C. (1800° F.) for one hour and water quenched. To austenize the steel, the pipe was then given a 926° C. (1699° F.) heat treatment for one and a half hours followed by a water quench. The pipe was then tempered at 635° C. (1175° F.) for two hours followed by a water quench. The inner liner of each pipe was evaluated for corrosion resistance using both ASTM A262-B and G48-C test procedures and found to be equivalent to the examples cited above.

TABLE 4

Composition of the Grade X65 Steel and the Corrosion Resistant Inner Liner Alloy

| Alloy | C | Mn | P | S | Ni | Cr | Mo | Cu |
|---|---|---|---|---|---|---|---|---|
| X65 | 0.11 | 1.25 | 0.008 | 0.005 | 0.28 | 0.10 | 0.20 | 0.14 |
| Liner | 0.008 | 0.08 | <0.005 | 0.001 | 65.8 | 22.24 | 9.04 | — |

| Alloy | Fe | Co | Al | Ti | Nb | V | Si |
|---|---|---|---|---|---|---|---|
| X65 | 97.55 | — | 0.04 | <0.01 | 0.04 | 0.05 | 0.31 |
| Liner | 2.18 | 0.05 | 0.34 | 0.20 | 0.14 | — | <0.005 |

Two billets for extrusion were prepared using a Grade X65 steel pipe (composition is given in Table 5 below) machined into a hollow cylinder having a 319 mm (12.56 inches) outer diameter by 69.5 mm (2.74 inches) wall by 1003.3 mm (39.5 inches) length with an inner liner of the corrosion resistant nickel alloy (composition is given in Table 5 below) and machined to 180 mm (7.09 inches) outer diameter by 23.2 mm (0.91 inches) wall by 1003.3 mm (39.5 inches) length. The nickel alloy was made using a VIM/ESR cast ingot. The extrusion billet was heated to 1232° C. (2250° F.) and extruded to a 10 meter (32.8 ft) pipe with an outer steel casing of 101.6 mm (4.0 inches) and an inner diameter of 86.5 mm (3.41 inches) at the interface and an inner corrosion resistant liner of 86.5 mm (3.41 inches) diameter at the interface and an inner liner diameter of 82.6 mm (3.25 inches). Thus, the steel casing was 15.1 mm (0.59 inches) in thickness and the corrosion resistant inner liner was 3.99 mm (0.157 inches) in thickness. The extrudate was air cooled to room temperature and then given a solution anneal at 982° C. (1800° F.) for one hour and a water quench. To austenize the steel, the pipe was then given a 926° C. (1699° F.) heat treatment for one and a half hours followed by a water quench. The pipe was then tempered at 635° C. (1175° F.) for two hours followed by a water quench.

TABLE 5

Composition of the Grade X65 Steel and the Corrosion Resistant Inner Liner Alloy

| Alloy | C | Mn | P | S | Ni | Cr | Mo | Cu |
|---|---|---|---|---|---|---|---|---|
| X65 | 0.11 | 1.25 | 0.008 | 0.005 | 0.28 | 0.10 | 0.20 | 0.14 |
| Liner 1 | 0.008 | 0.086 | <0.005 | <0.001 | 65.89 | 22.18 | 9.10 | — |
| Liner 2 | 0.008 | 0.077 | <0.005 | <0.001 | 66.44 | 22.04 | 8.82 | — |

| Alloy | Fe | Al | Ti | Nb | V | Si |
|---|---|---|---|---|---|---|
| X65 | 97.55 | 0.04 | <0.01 | 0.04 | 0.05 | 0.31 |
| Liner 1 | 2.07 | 0.240 | 0.176 | 0.12 | — | 0.124 |
| Liner 2 | 1.98 | 0.241 | 0.162 | 0.12 | — | 0.109 |

The pipe was then evaluated for mechanical properties. Per ASTM E8, the pipe was found to have an 84.1 ksi 0.2% yield strength, an ultimate tensile strength of 97.4 ksi, and an elongation of 32.5%. The Charpy Impact strength was 165 ft-lbs (average of three tests) at −29° C. (−20° F.). The midwall hardness of the steel was measured as 221 Vickers per ASTM E384 using a 10 kgf indenter load, and the inner liner hardness was 176 Vickers.

Although the invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method of producing a nickel alloy clad steel pipe comprising:
   providing a hollow cylinder of nickel alloy cladding material and a hollow cylinder of steel;
   placing the hollow cylinder of the nickel alloy cladding material concentrically inside the hollow cylinder of steel to form a composite billet;
   heating the composite billet to an extrusion temperature of 1121-1260° C.; and
   extruding the heated composite billet into an extrudate,
   wherein the nickel alloy cladding material: comprises 6.0 to 12.0 wt. % molybdenum, 19.0 to 27.0 wt. % chromium, 1.0 wt. % maximum tungsten, 0.6 wt. % maximum aluminum, 0.6 wt. % maximum titanium, 0.001 to 0.05 wt. % carbon, 0.001 to 0.035 wt. % nitrogen, 0.001 to 0.3 wt. % silicon, 1.0 wt. % maximum niobium, 2.5 wt. % maximum iron, 0.5 wt. % maximum manganese, 0.015 wt. % maximum phosphorous, 0.015 wt. % maximum sulfur, 1.0 wt. % maximum cobalt, and the balance nickel and incidental impurities.

2. The method according to claim 1, wherein the nickel alloy cladding material comprises 8.5 to 10.0 wt. % molybdenum, 20.0 to 23.0 wt. % chromium, 1.0 wt. % maximum tungsten, 0.4 wt. % maximum aluminum, 0.4 wt. % maximum titanium, 0.025 wt. % maximum carbon, 0.02 wt. % maximum nitrogen, 0.15 wt. % maximum silicon, 0.75 wt. % maximum niobium, 1.0 wt. % maximum iron, 0.5 wt. % maximum manganese, 0.015 wt. % maximum phosphorous, 0.015 wt. % maximum sulfur, 1.0 wt. % maximum cobalt, and the balance nickel and incidental impurities.

3. The method according to claim 1, wherein the nickel alloy cladding material comprises 8.5 to 10.0 wt. % molybdenum, 20.0 to 23.0 wt. % chromium, 1.0 wt. % maximum tungsten, 0.4 wt. % maximum aluminum, 0.4 wt. % maximum titanium, 0.01 wt. % maximum carbon, 0.02 wt. % maximum nitrogen, 0.15 wt. % maximum silicon, 0.5 wt. % maximum niobium, 0.5 wt. % maximum iron, 0.5 wt. % maximum manganese, 0.015 wt. % maximum phosphorous, 0.015 wt. % maximum sulfur, 1.0 wt. % maximum cobalt, and the balance nickel and incidental impurities.

4. The method according to claim 1, wherein the nickel cladding alloy comprises greater than 0 wt. % niobium.

5. The method according to claim 1, wherein the steel is selected from the group consisting of carbon steel, low alloy steel, or chrome-molybdenum steel.

6. The method according to claim 1, further comprising heat treating of the extrudate and air cooling or water quenching, followed by one or more heat treatments selected from the group consisting of solution annealing, austenizing, and tempering.

7. The method according to claim 6, further comprising a water quench after each heat treatment.

8. The method according to claim 1, wherein the nickel cladding has a solidus temperature of greater than 1312° C.

9. A method of producing a nickel alloy clad steel pipe comprising:
providing a hollow cylinder of nickel alloy cladding material and a hollow cylinder of steel;
placing the hollow cylinder of the steel concentrically inside the hollow cylinder of nickel alloy cladding material to form a composite billet;
heating the composite billet to extrusion temperature of 1121-1260° C.; and
extruding the heated composite billet into an extrudate, wherein the nickel alloy cladding material comprises 6.0 to 12.0 wt. % molybdenum, 19.0 to 27.0 wt. % chromium, 1.0 wt. % maximum tungsten, 0.6 wt. % maximum aluminum, 0.6 wt. % maximum titanium, 0.001 to 0.05 wt. % carbon, 0.001 to 0.035 wt. % nitrogen, 0.001 to 0.3 wt. % silicon, 1.0 wt. % maximum niobium, 2.5 wt. % maximum iron, 0.5 wt. % maximum manganese, 0.015 wt. % maximum phosphorous, 0.015 wt. % maximum sulfur, 1.0 wt. % maximum cobalt, and the balance nickel and incidental impurities.

10. The method according to claim 9, wherein the nickel alloy cladding material comprises 8.5 to 10.0 wt. % molybdenum, 20.0 to 23.0 wt. % chromium, 1.0 wt. % maximum tungsten, 0.4 wt. % maximum aluminum, 0.4 wt. % maximum titanium, 0.025 wt. % maximum carbon, 0.02 wt. % maximum nitrogen, 0.15 wt. % maximum silicon, 0.75 wt. % maximum niobium, 1.0 wt. % maximum iron, 0.5 wt. % maximum manganese, 0.015 wt. % maximum phosphorous, 0.015 wt. % maximum sulfur, 1.0 wt. % maximum cobalt, and the balance nickel and incidental impurities.

11. The method according to claim 9, wherein the nickel alloy cladding material comprises 8.5 to 10.0 wt. % molybdenum, 20.0 to 23.0 wt. % chromium, 1.0 wt. % maximum tungsten, 0.4 wt. % maximum aluminum, 0.4 wt. % maximum titanium, 0.025 wt. % maximum carbon, 0.02 wt. % maximum nitrogen, 0.15 wt. % maximum silicon, 0.75 wt. % maximum niobium, 1.0 wt. % maximum iron, 0.5 wt. % maximum manganese, 0.015 wt. % maximum phosphorous, 0.015 wt. % maximum sulfur, 1.0 wt. % maximum cobalt, and the balance nickel and incidental impurities.

12. The method according to claim 9, wherein the nickel cladding alloy comprises greater than 0 wt. % niobium.

13. The method according to claim 9, wherein the steel is selected from the group consisting of carbon steel, low alloy steel, or chrome-molybdenum steel.

14. The method according to claim 9, further comprising heat treating of the extrudate and air cooling or water quenching, followed by one or more heat treatments selected from the group consisting of solution annealing, austenizing, and tempering.

15. The method according to claim 14, further comprising a water quench after each heat treatment.

16. The method according to claim 9, wherein the nickel cladding has a solidus temperature of greater than 1312° C.

\* \* \* \* \*